W. ACTON AND W. M. MacKEAN.
SEPARATION OF SOLIDS FROM LIQUIDS.
APPLICATION FILED NOV. 22, 1920.
1,435,886.
Patented Nov. 14, 1922.
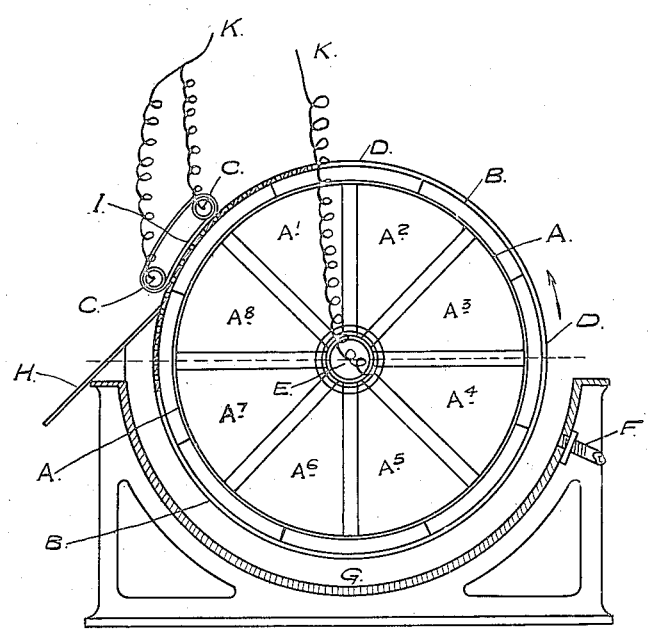

Patented Nov. 14, 1922.

1,435,886

UNITED STATES PATENT OFFICE.

WALTER ACTON AND WILLIAM MUIR MacKEAN, OF PAISLEY, SCOTLAND.

SEPARATION OF SOLIDS FROM LIQUIDS.

Application filed November 22, 1920. Serial No. 425,825.

*To all whom it may concern:*

Be it known that we, WALTER ACTON, of Mossvale Cottage, Greenock Road, Paisley, in the county of Renfrew, Scotland, and WILLIAM MUIR MACKEAN, of Inverkar, Paisley, Scotland, have invented certain new and useful Improvements in and Connected with the Separation of Solids from Liquids, of which the following is a specification.

Our invention relates to improvements in and connected with the separation of solids from liquids, whereby pressure filtration and electrical cataphoresis are jointly, simultaneously or successively applied to a turbid liquid for the purpose of separating and dehydrating the particles of solid matter suspended therein, and is specially applicable for the separation of water from colloidal matter suspended therein. The invention depends on the fact that, if an aqueous sludge is made part of an electrical circuit, the water is repelled from the anode and thereby concentrated on the cathode; if now the cathode is porous or perforate and a mechanical pressure or vacuum applied to withdraw the excess of water through the cathode, an increased dehydration of the material is obtained.

One effective method of carrying out our invention consists in the provision of a rotating segmentated vacuum filter having the body or filter cloth supports of an electrical conducting material, such as wire net or perforate metal, which constitutes one pole of the electrical circuit and a conducting shoe, roller or slipper, in contact with the outside of the cake constituting the other electrical pole.

In order to give an extended area to the outer pole, we have found it advantageous to construct it in the form of an endless band of wire moving over two rollers and so arranged that one surface of the wire cloth band is pressed on the outer surface of the cake of material to be treated and moves with and at the same speed as the cake either by friction or by an external drive.

In order that our invention may be properly understood and readily carried into effect, we have hereunto appended one form of appliance to which our invention may be applied, i. e. a drum vacuum filter.

Referring to the drawing A, is the drum of the rotative segmentated vacuum filter, $A^1$, $A^2$, $A^3$, $A^4$, $A^5$, $A^6$, $A^7$, and $A^8$ being the segments thereof for carrying off the water through the centre hole spindle, E. B are the body or filter cloth supports of an electrical conducting material constituting one pole of the electric circuit, and C are the rollers carrying an endless band of wire cloth constituting the other electrical pole in contact with the outer surface of the wet material which moves by friction with the drum, i. e. the perforated drum A may be the cathode while the slipper or shoe C may be the anode or vice versa while the material D to be treated passes between them. The drum rotates in the direction indicated by the arrow. F is the feed pipe for the supply of the material to the drum A, while G is the trough or tank for any superfluity or excess of the material which is not taken up by the drum A on its rotation, and H is a scraper to remove the solid material or cake after separation of the same from the water. K are the electrical connections.

The position of the poles varies with the liquid and the solid phases, for example in the case of a suspension of corn starch in water, the drum is made the cathode. The efficiency increases to a certain extent with increasing voltage, but for a cake $\frac{1}{2}''$ thick about 15 volts or thereby is suitable for a number of substances in water. The material is fed through the inlet F onto the vacuum filter medium B and when most of the liquid has been drawn off through the segments by the vacuum, when by revolution of the drum the cake is brought under electrode I and the current passes through the cake, causing a flow of water towards electrode B which is also the filter cloth support, the vacuum now removes the excess of water on B, rendering the cake more dry and the separation more efficient. The longer the time of current flow, the more liquid is removed.

The efficiency of the process can be increased in cases when an electrolyte can be added which is absorbed by the solid phase.

Claims:

1. The method of separating solids from liquids, consisting in passing an electric current through an aqueous sludge while subjecting the same to pressure between two elements one of which forms an anode and the other a cathode.

2. Means for separating solids from liquids, comprising a rotatable drum, means to apply an aqueous sludge to the surface thereof, a pressure element bearing against the drum, to subject material to pressure therebetween, said drum and said pressure element constituting one the anode and the other the cathode of an electric current.

In witness whereof we affix our signatures.

WALTER ACTON.
WILLIAM MUIR MacKEAN.

Witnesses:
JOHN TRAIN LIDDLE,
O. M. EDELLE,